(12) United States Patent
Araki et al.

(10) Patent No.: US 6,314,706 B1
(45) Date of Patent: Nov. 13, 2001

(54) VERTICAL TYPE OF BAG-MAKING, FILLING AND PACKAGING APPARATUS AND A PACKAGING METHOD THEREOF

(75) Inventors: Shigeru Araki, Hachioji; Hirotsugu Takegawa, Mita, both of (JP)

(73) Assignee: Technica Co., Ltd., Tokyo (JP)

( * ) Notice: Subject to any disclaimer, the term of this patent is extended or adjusted under 35 U.S.C. 154(b) by 0 days.

(21) Appl. No.: 09/325,340

(22) Filed: Jun. 4, 1999

(51) Int. Cl.[7] .................................. B65B 1/32; B65B 9/20
(52) U.S. Cl. ................................. 53/451; 53/502; 53/551
(58) Field of Search .................... 53/451, 551, 552, 53/554, 131.2, 411, 502

(56) References Cited

U.S. PATENT DOCUMENTS

| | | |
|---|---|---|
| 3,650,773 * | 3/1972 | Bush et al. ........................... 53/411 |
| 4,018,029 | 4/1977 | Safranski et al. . |
| 4,090,344 | 5/1978 | Kelly . |
| 4,117,647 * | 10/1978 | Rossi ................................... 53/551 |
| 4,407,108 | 10/1983 | Craig . |
| 4,800,707 * | 1/1989 | Rabus ................................... 53/552 |
| 5,832,700 * | 11/1998 | Kammler et al. .................... 53/502 |

* cited by examiner

Primary Examiner—John Sipos
(74) Attorney, Agent, or Firm—Oliff & Berridge, PLC

(57) ABSTRACT

The packaging apparatus comprises a former for forming a film sheet to a cylinder, a vertical chute pipe coaxially disposed in the former, support members for supporting the chute pipe disposed on load cells fixed on a frame separately in structure, a vertical heat sealer for sealing the film sheet into a cylinder, a controller for calculating the weight of goods to be put in the cylinder, a weighing unit for putting the goods in the cylinder while being controlled by the controller, a lateral heat sealer for sealing the cylinder under the end of the chute pipe for closing the cylinder filled with the goods and separating it by cutting while remaining a bottom portion of a next bag, wherein the controller controls a sequential steps of operation of the apparatus.

7 Claims, 6 Drawing Sheets

VERTICAL TYPE OF BAG-MAKING, FILLING AND PACKAGING APPARATUS AND A PACKAGING METHOD THEREOF

BACKGROUND OF THE INVENTION

1. Field of the Invention

The present invention relates to a bag-making, filling and packaging apparatus with a weighing unit (device) by which a bag made of a film sheet or the like is filled with goods such as potato chips by every given weight in a backyard of a supermarket, etc.

2. Description of the Related Art

As well known, an improvement in citizen's life has been supported by a remarkable development of technology, and for example, the life of food, clothing and shelter is remarkably largely caused by the merits supported by the excellent quality of the respective goods and the circulation which is quantitatively stabilized For example, when selling or purchasing the goods of foods such as potato chips in the transaction of the goods on the market for the circulated goods, it is greatly important that the weight and capacity of the goods are uniformly and standardizedly determined to one given value for transaction from the viewpoint of standardizing the circulation. Accordingly, there is a demand in which the goods are assorted or the weight and capacity of the goods are measured in the backyard of the supermarket on the market for the circulated goods.

For example, when the goods are filled and packaged in a bag made of a film sheet or the like in the backyard of the supermarket, a technique by which the bag is made with the film sheet, filled with the goods and packaged, has been put to practical use and widely employed.

In a general and practical manner, there is such an explanation that the goods such as the potato chips which have been weighed to a predetermined weight are filled and packaged in the bag of the pillow type or the like. The outline of this general mode is briefly described with reference to FIGS. 6, 7A and 7B a vertical type of bag-making, filling and packaging apparatus 1, a film sheet 3 made of a polyethylene sheet or the like wound around a bobbin 2 is formed as a cylindrical bag-making film sheet 3' on the outer side of a chute pipe 7 provided through a former 6 while being drawn through guide rollers 4, dancer rollers 5 and the former 6. Both sides of the film sheet 3' formed in a cylinder is thermally sealed by a vertical heat sealer 8 and the portion protruded from the lower end thereof is sealed by a lateral heat sealer to make a bottom portion Ill of the cylindrical film sheet 3'. The cylindrical film sheet 3' is drawn down at the outer side of the chute pipe 7 at a predetermined timing by a draw-down unit 9 disposed at the side of the vertical heat sealer 8. The goods such as potato chips of a predetermined weight which has been weighed by a weighing unit 10 connected with the chute pipe 7 in a predetermined manner are put in the cylinder 3' from the upper opening of the chute pipe 7. A bag filled with the goods and closed at the portion of 112, at which a subsequent bottom portion is formed simultaneously, which is obtained by cutting piece by piece at the portion 112 through a cutter built in a lateral heat sealer not shown and then transported through a conveyor not shown to a packaging machine or the like downstream.

There can be connected with an auger filler 10' as a capacity measuring unit shown in FIG. 7A or a volume measuring unit 10" shown in FIG. 7B instead of the weighing unit 10.

In the above conventional vertical type of bag-making, filling and packaging apparatus, when the bag of the pillow type in which the goods are filled is made, since the height of the apparatus becomes tall when the vertical type of bag-making, filling and packaging apparatus 1 is used, and the weighing unit 10 is also connected thereto, the height of a space where the apparatus is accommodated needs to be increased in the backyard of the supermarket or the like. This leads to such a drawback that the apparatus cannot be located in the space where the ceiling is low or at a place where the space is small, and also to such difficulty that the weighing unit is considerably expensive, and the designing freedom of combination of the vertical type of bag-making, filling and packaging apparatus 1 and the weighing units 10, 10' or 10" is low to make it very hard to design the apparatus location.

The above problem is caused not only by a case in which the weighing unit 10 is directly mounted on the chute pipe 7, etc. but also by a case when the auger filler 10' shown in FIG. 7A is used, in which a problem is caused by a fluctuation of the weight due to a variation in the apparent specific gravity of the goods because the auger filler 10' is a measuring unit that naturally measures the capacity, resulting in an inconvenience when a predetermined weight is indicated on the surface of the bag which has been filled with the goods.

Similarly, in the volume measuring unit 10" shown in FIG. 7B, the weight fluctuates due to a variation in the apparent specific gravity of the goods as in the above auger filler, resulting in inconvenience when a predetermined weight is indicated on the surface of the bag which has been filled with the goods.

To cope with these drawbacks, there are such modes that the weight of the goods packed in the bag is checked per every bag, and the weight is arithmetically operated to measure the capacity, or the weight is fed back to the auger filler 10' to change the supplied amount of the goods. However, these modes need to have the structure of the device remarkably complicated, resulting in a drawback that the costs increase.

SUMMARY OF THE INVENTION

The present invention has been made to solve the above technical problems with various correlations of the packaging, measuring and filling of the goods while keeping the advantages of the above conventional system in which the film sheet drawn out from a bobbin is made into a bag through the former, and the goods are measured, filled and packaged in the bag. Therefore, an object of the present invention is to provide an excellent vertical type of bag-making, filling and packaging apparatus and a method directly used for the apparatus which are advantageous to an applied field of a measuring a weight, filling and packaging technique in a circulation industry in which bag-making using the film sheet and the measuring of the goods are carried out in a consecutive process simultaneously so that the apparatus is simplified, the structure of it is made compact, the treatment is excellent and the maintenance, inspection and servicing etc. are readily carried out.

In order to achieve the above object, according to a first aspect of the present invention, there is provided a vertical type of bag-making, filling and packaging apparatus in which a film sheet is supplied from a bobbin to a former and then made into a cylinder with a bottom, and while weighed goods are put in the bag, wherein the apparatus comprises a frame, the former to form a body portion (cylinder) of a bag, a chute pipe which is provided in support members so as to pierce coaxially with the former and be elongated downward, a vertical heat sealer which joins the both sides of the film sheet extending downward and surrounding the chute pipe and makes it cylinder, a vacuum device which draws the cylinder downward intermittently by a stroke corresponding to one bag depth, a lateral heat sealer which seals the lower end of the cylinder drawn down and protruded from the lower end of the chute pipe to form a bottom of a cylinder, a weighing unit being disposed with a controller (circuit) which weighs the goods to be put in the bag and puts the goods into an upper opening of the chute pipe and load cells which are fixed on the frame, receives the weights of the goods, the cylinder (film sheet) hanging on the former, the former with the chute pipe and support members of the chute pipe and transmits an electric signal of that total weight to the controller to control the weight of the goods to be put in the cylinder to a predetermined value, wherein the lateral heat sealer closes the cylinder by sealing it at a protruded portion from the lower end of the chute pipe and separates the bag filled with the goods while remaining the bottom portion of a subsequent bag.

According to a second aspect of the present invention, the apparatus comprises further an injector which prints the predetermined weight on the bag filled with the goods.

According to a third aspect of the present invention, said vacuum device functions in synchronization with the weighing unit.

According to a fourth aspect of the present invention, the supporting members comprise a pair of stays provided on the load cells fixed on the frame and a sub base plate between the stays for supporting the chute pipe.

According to a bag-making, filling and packaging method of a fifth aspect of the present invention, in a method of packaging goods while bag-making vertically by being supplied with a film sheet, filling goods and packaging, the method further comprises steps of providing by being fixed load cells on a frame of the vertical type of bag-making, filling and packaging apparatus, weighing the total weight of a cylinder of the film sheet hanging on a former with goods to be put, a former with a shute pipe together with the support members by the load cells, transmitting an electric signal of the total weight to the controller for calculating merely the weight of the goods in the cylinder by operating and controlling the weighing unit.

According to a sixth aspect of the present invention, in a method of packaging, wherein goods are to be filled through a chute pipe provided in a former for bag-making by being supplied with a film sheet from a bobbin, sealed at the sides of the film sheet wound on the chute pipe by the former to form a cylinder and sealed at the portion protruded from the lower end of the chute pipe to form a bottom portion of a cylinder also the cylinder sheet is drawn downward through the operation of the vacuum device by a stroke corresponding to a depth of a cylinder and after being filled with the goods the cylinder is sealed again to close the bag filled with goods, simultaneously while forming a bottom portion of a subsequent bag and the bag is separated, the method further comprises the steps, while bag-making, of weighing a total weight of goods put in the bag, the film sheet hanging on the former and the former with a chute pipe provided on support members which are put on load cells fixed on a frame separately from the frame in structure, transmitting an electric signal of that total weight from the load cells to a control circuit in association with the weighing unit of the goods and controlling the volume of the goods to be put in the bag to a predetermined value.

In the above structure, when the goods of a predetermined weight such as potato chips are filled in the cylinder formed from the film sheet, the film sheet drawn out from the bobbin is supplied to the former through the guide rollers and dancer rollers, the film sheet is cylindrically formed in the periphery of the chute pipe pierced in the former (piped in double with the chute pipe) and both sides of the film sheet are trued up and thermally sealed. Also, the film sheet is drawn downward by the draw-down device that rotates in close contact with the film sheet through the operation of the vacuum device, and at the same time, a pair of load cells receive the weights of the former in a unit with the chute pipe and the cylinder hung from the former with support members disposed on the load cells fixed on the frame separately in structure of the frame, and thereby the weight of the goods put in the cylinder of the chute pipe is weighed. And the measured data is arithmetically operated from the measured data to obtain accurately only the weight of the put goods, further outputted to a device such as an ink jet printer so that the weight of the goods put in the cylinder film sheet is printed on the surface of the bag filled with the goods etc. Also, in a drive source, and the program for a large amount of filling, a small amount of filling or stoppage is installed accurately measured according to the exchange of data with respect to the load cells, a given weight can be measured by capacity measurement.

BRIEF DESCRIPTION OF THE DRAWINGS

These and other objects, features and advantages of this invention will become more fully apparent from the following detailed description taken with the accompanying drawings in which:

FIGS. 7A and 7B are schematic perspective views showing a conventional capacity measuring unit in which FIG. 7A is a schematic perspective view of an auger filler, and FIG. 7B is a schematic perspective view of the entire volume measuring unit of the capacity measuring unit.

DETAILED DESCRIPTION OF THE PREFERRED EMBODIMENTS

Now, a description will be given in more detail of a preferred embodiment of the present invention with reference to FIGS. 1 to 5.

Figure 6:
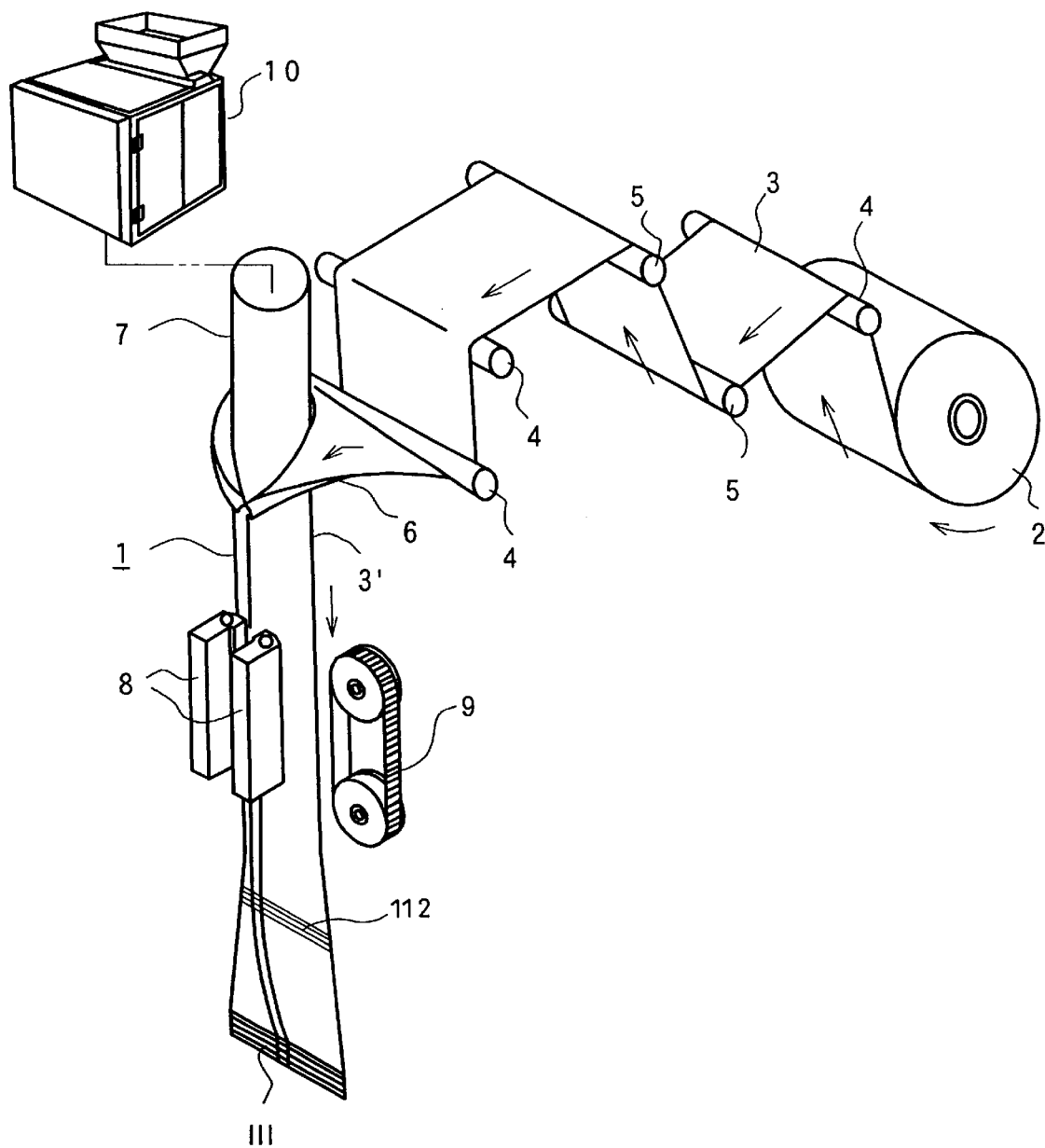
FIG. 6 is a perspective view showing one conventional vertical type of bag-making, filling and packaging apparatus.

In the description, the same parts as those in FIGS. 6 and 7 are designated by the same references.

Figure 1:
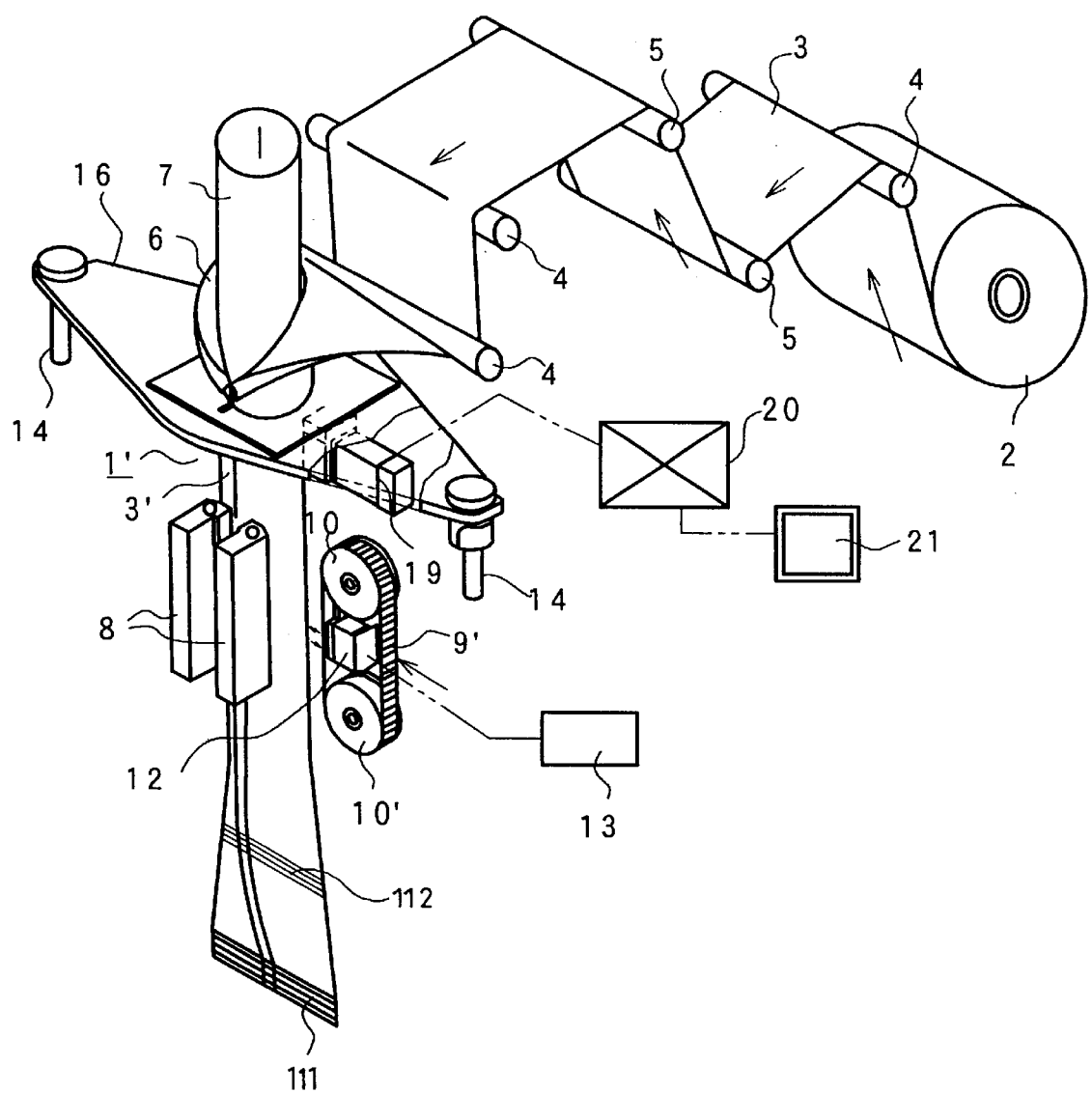
FIG. 1 is a schematic perspective view showing an entire vertical type of bag-making, filling and packaging apparatus in accordance with the present invention.
Figure 2:
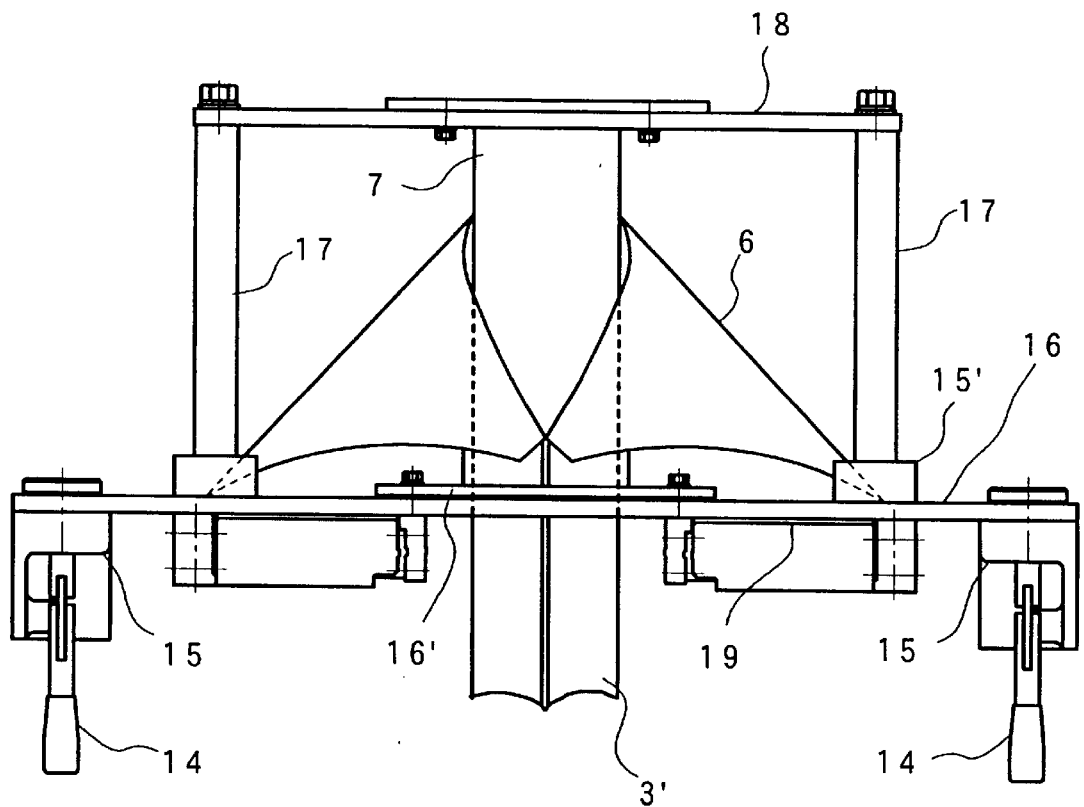
FIG. 2 is a partially sectional front view showing an arrangement in which a part of a chute pipe and a former are disposed on load cells.
Figure 3:
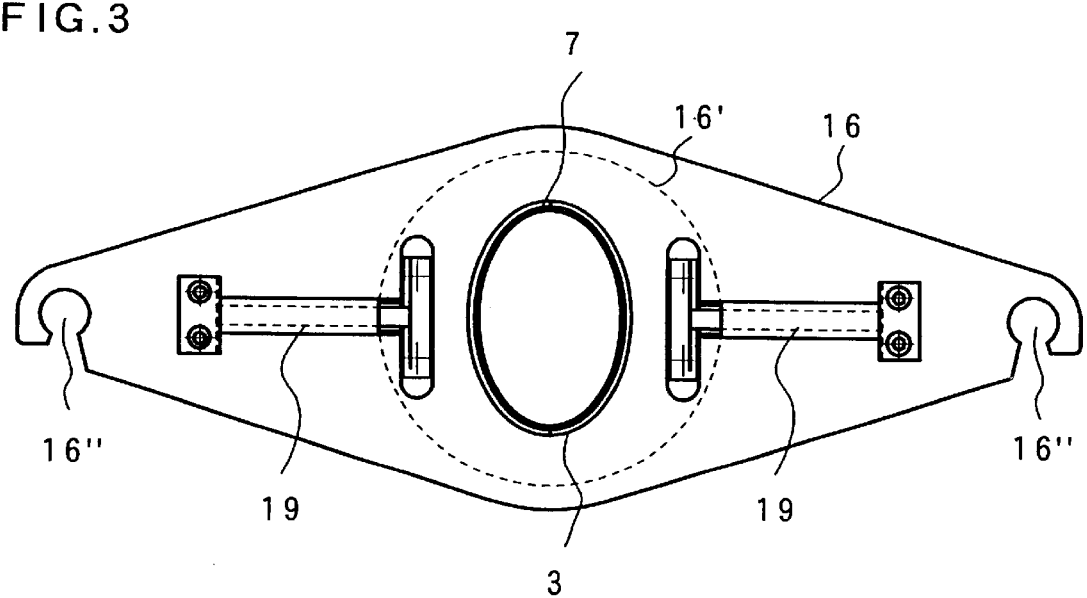
FIG. 3 is a plan view taken along a line III—III of FIG. 2.

In FIG. 1, reference numeral 1' denotes a vertical type of bag-making, filling and packaging apparatus of the present invention. In the apparatus 1', a film sheet 3 made of polyethylene and wound on a bobbin 2 is supplied to a former 6 through guide rollers 4 and dancer rollers 5 and formed into a cylinder along the outer peripheral surface of a chute pipe 7 coaxially disposed in a cylinder portion (not shown) of the former 6. Then, both sides of the film sheet 3' wound around the chute pipe 7 are sealed by a vertical heat sealer 8 to form the film sheet 3' into a cylinder, and the cylinder 3' is drawn down by a vacuum draw-down device 9' to be described later in detail, which is disposed on the side portion of the cylinder 3', by a stroke of one bag intermittently. Then, the cylinder 3' is subjected to lateral heat sealing 111 to form a bottom portion of a cylinder on one hand and the other hand functions simultaneously as closing the filled cylinder after filling goods by the lateral heat sealer (not shown) disposed at a position below the lower end of the chute pipe 7, then, goods such as potato chips not shown are put in the cylinder 3' through the chute pipe 7 by a shutter type nipper. Then, again the lateral sealer seals (112) the film sheet 3' for closing the goods filled bag while forming the bottom portion of a subsequent bag. Then, the goods filled bag is separated by being cut by the (cutter built-in) lateral sealer, which is conveyed by a conveyor not shown to a succeeding packing process.

FIGS. 1 to 4 show the main portion of a weighing mechanism for the goods which is one essential point of the vertical type of bag-making, filling and packaging apparatus 1. In those figures, a former base plate 16 is fixed to a pair of brackets 15 disposed on a frame not shown at notches 16" defined at the respective end portion thereof by lock handles 14. A sub base plate 18 is put between a pair of sub-stays 17 erected between those brackets 15, and an upper end portion as an opening of the chute pipe 7 is mounted at the sub base plate 18 so that the chute pipe 7 is fixedly supported and hung on the sub base plate as a support member.

And, through the sub base plate 18, the sub-stays 17 and the sub brackets 15' provided at the proximal portion of the sub stays 17 as the support members, the former 6 and the chute pipe 7 being in a unit with the former 6 are supported floatingly on a pair of well-known load cells 19 fixed on the back side of the base plate 16 and their total weights are adapted to be measured. Accordingly, the weights of the cylinder 3' formed around the chute pipe 7 and the goods, such as potato chips, put from the upper opening of the chute pipe 7 are adapted to be measured together with the support members.

The total weight of the former 6 including the chute pipe and the support members, the goods 111' put and filled in the cylinder 3' are measured by the load cells 19. The weighing data is electrically inputted to a control unit 20 attached on the not-shown frame, and a not-shown computer installed within the control unit 20 subjects the previously known weight data of the former 6 with the support members and the cylinder 3' to subtracting operation and conducts zero setting. Then, the computer deletes the known weight of the former 6 etc. and the cylinder 3' having a predetermined length from the the total weight transmitted by the load cells through arithmetic operation so as to control only the weight of the goods 111' which have been put in and filled in the cylinder 3'. In addition, the calculated weighing data of the goods 111' is outputted to an output unit 21 such as an ink jet printer and printed on the surface of the bag or recorded as data.

Figure 4:
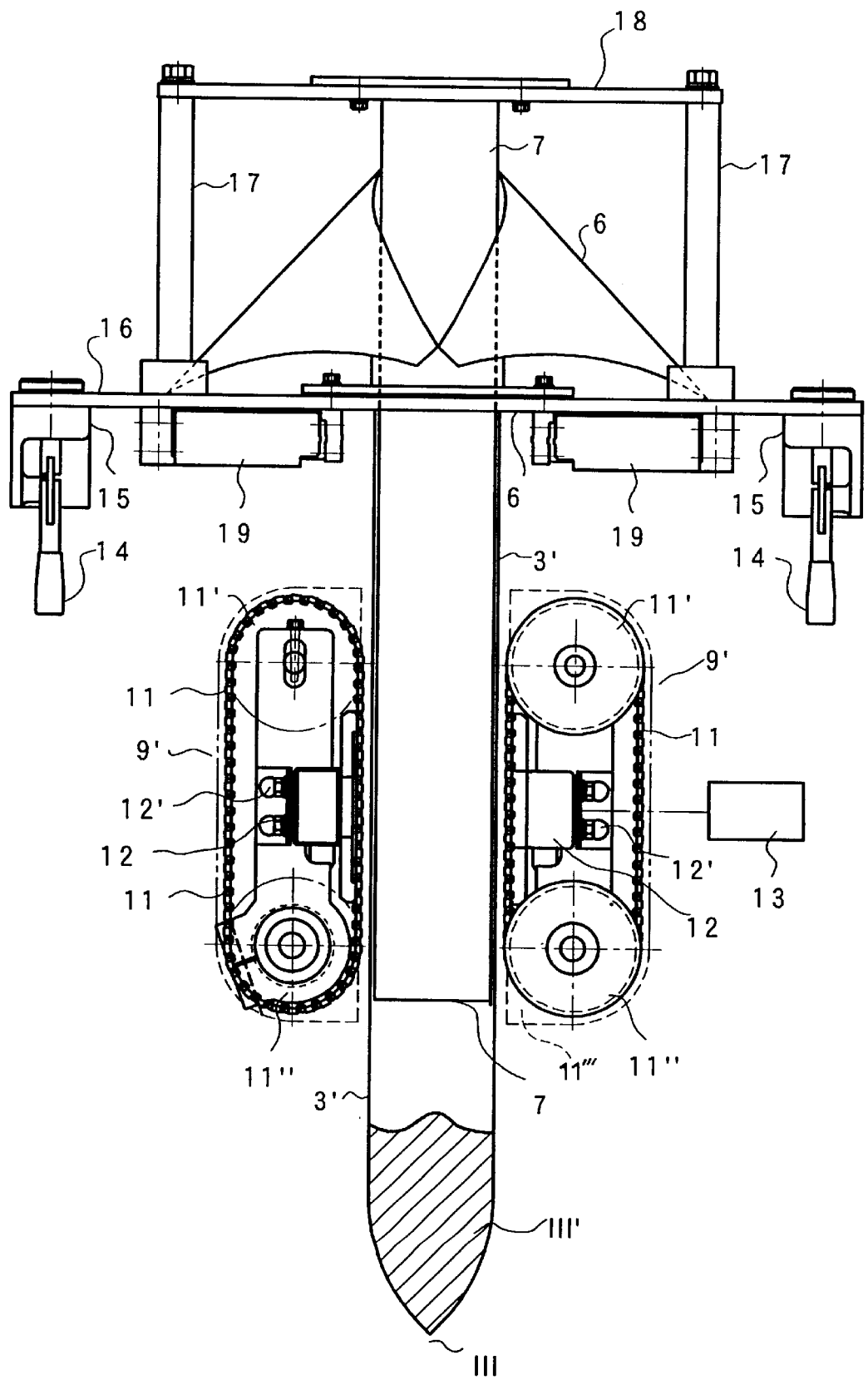
FIG. 4 is a side view partially in section showing an arrangement in which the vertical sealer and a draw-down device are disposed.

In the vacuum draw-down device 9' that moves forward and backward, as shown in FIG. 4, at the outer side of the cylindrical film sheet 3' which is formed outer side of the chute pipe 7, belts 11 having film sheet suction holes are put between driving pulleys 11" coupled with a given driving unit not shown and driven pulleys 11' at the lower side of the frame 11'". The belts 11 opposed to each other with respect to the chute pipe 7 are provided with the respective vacuum sucking units 12 which are connected to a vacuum unit 13. A not-shown change-over valve coupled to the vacuum unit 13 is actuated in response to a control signal at a predetermined timing from the weighing control unit 20 in such a manner that the vacuum sucking unit 12 makes the belt 11 sucked to draw down the cylinder 3' at one stroke corresponding to one bag, released it from the belts 11 and stopped the draw-down of the film sheet 3'. As a result, the weight of the goods 111' put in and filled in the cylinder 3' is supported through the cylinder 3' so as not to adversely affect the weighing.

Figure 5:
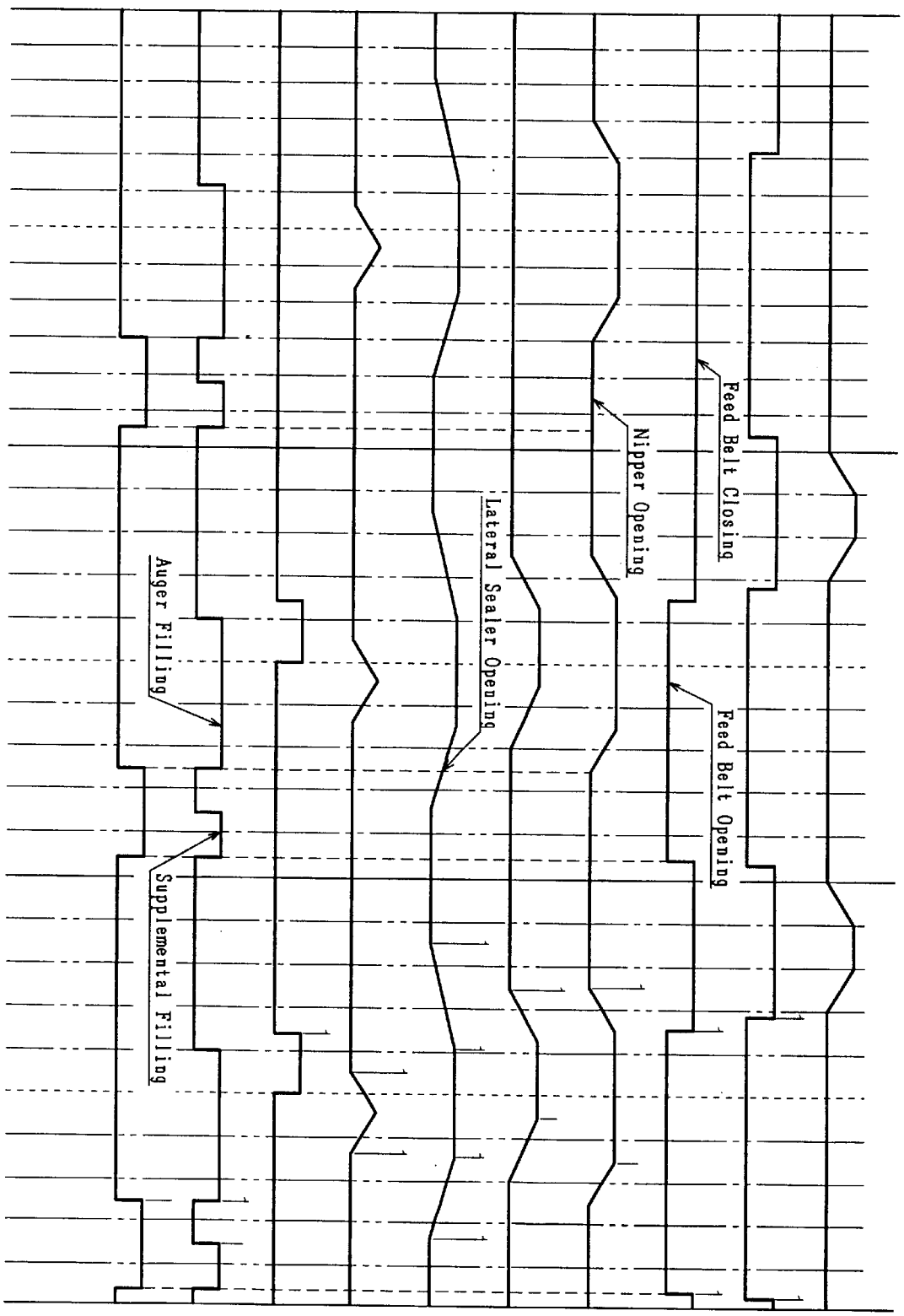
FIG. 5 is a flowchart showing an operating state.

The operation of the belts 11 and the lateral heat sealer and the open/close operation of the nipper are carried out as shown in a flowchart of FIG. 5.

The word "nipper" which is located at the third step from the top of FIG. 5 showing the flowchart means a nipper having a shutter function which is located above the chute pipe 7.

Accordingly, the open/close state of the belts 11 with respect to the cylinder 3' at the outer side of the chute pipe 7 is appropriately controlled by the open/close operation of the vacuum unit 13 and the vacuum type draw-down 9' according to predetermined program so that the vacuum type draw-down unit 9' does not operate at a timing where weighing is made by the load cells 19. Accordingly, the total weight of the former 6, the cylinder 3' at the outer side of the chute pipe 7 and the goods 111' put in and filled in the film sheet 3' is accurately measured by the load cells 19, and the weighing data is supplied to the controller 20. The filling of the auger and the supplemental filling at the lower portion of FIG. 5 are shown as a mode of operating data in a mode used when capacity is measured which will be described in the flowchart at the same time.

Accordingly, in this embodiment, the bag-making filling and packaging by use of the film sheet 3 from the bobbin 2 through the former 6 and the weighing of the goods put in and filled in the film sheet 3 through the chute pipe are accurately carried out at the same time.

Upon the arithmetic operation by the weighing controller 20, the vacuum type draw-down device 9' and the change-over valve of the vacuum unit 13 are actuated through the controller 20 to suck the film sheet 3' formed into a cylinder at the outer side of the chute pipe 7 through the chute pipe 7. Then, the film sheet 3' is drawn down by a given stroke according to the operation of the driving pulleys 11" and the driven pulleys 11 by the vacuum sucking unit 12, during which the lateral heat sealing 111 is effected by the lateral heat sealer not shown, and cutting is carried out by the cutter installed within the lateral heat sealer, whereby the unit bag filled with a predetermined amount of goods 111' is separated and drops so as to be conveyed to a succeeding packing process through the conveyor.

In the above structure, the vacuum type draw-down unit 9' is brought into a non-suction state through the vacuum sucking unit 12 and the belts 11 by the vacuum unit 13 at the time of an initial set, that is, in a state where the belts 11 are not drawn apart from the cylinder at the outer side of the chute pipe 7. The cylinder 3' at the outer side of the chute pipe 7 from the film sheet 3 drawn out from the bobbin 2 previously is brought into a draw-down state, and the lateral heat sealing 111 is effected by the not-shown lateral heat sealer to form a bottom portion and cut that portion to separate the precedingly sealed bag filled with the goods and by the vacuum device the cylinder 3' is drawn down by one bag's length stroke. Then, when the goods 111' are put in and filled in the film sheet 3' from the upper opening of the chute pipe 7 by a goods supply unit not shown, load cells 19 measure the total weight of the former 6 integrally with the support members floatingly on the load cells 19, the cylinder 3' and the goods 111' filled in the cylinder 3'. The weighing data is transmitted to the controller 20, and a not-shown computer installed within the controller 20 subjects the previously known weight data of the former 6 with support members and the cylinder 3' to a subtraction operation by the transmitted data and conducts zero setting. Only the weight data of the goods 111' which have been put in and filled in the cylinder 3' is arithmetically operated, and only the weighing data of the goods 111' is outputted to an output unit 21 such as an ink jet printer and the unit weight is printed and indicated on the surface of the bag having the goods 111' put therein, etc. At the time of completing the output indication, the vacuum unit 13 is again operated so as to suck the film sheet 3' through the vacuum sucking unit 12 and the respective belts 11 opposed to each other. The cylindrical film sheet 3' is drawn down by one stroke corresponding to a bag depth according to the rotating operation of the driving pulleys 11" and the driven pulleys 11', and the opposed sides of the cylindrical film sheet 3' are vertically thermally heated by the vertical heat sealer 8. The film sheet 3 drawn out from the bobbin 2 is conveyed to the former 6 through the guide rollers 4 and the dancer rollers 5 by the draw-down operation of the film sheet 3' and formed cylinder at the outer side of the chute pipe 7. Initially, the lower portion of the cylinder 3' protruded from the lower end of the chute pipe 7 is heat sealed (111) by a lateral sealer to form a bottom portion of a cylinder. Then, at the time when the cylinder 3' is drawn by a predetermined stroke, and the goods 111' are put in and supplied to the cylinder 3' from the goods supply unit not shown so that the goods are filled in the cylinder 3'.

The above process is repeated, and each unit bag in which the goods of predetermined weight are put, and separated is simply manufactured, and conveyed to a succeeding packing process through a conveyor not shown, as in the conventional mode.

Accordingly, in the above embodiment, as shown in FIG. 6, bag-making, filling and packaging are carried out without the weighing unit 10 being directly or indirectly on the top portion of the chute pipe 7 together, that is, without the height of the vertical bag-making, filling and packaging apparatus 1 being increased, without being bulky, without the location space as large as the weighing unit 10 being required, and without any problems even in a small space such as a space in which the height of the ceiling is low.

The embodiment mode of the present invention is not limited to the above-described embodiments. For example, a mode of measuring the capacity is applicable instead of the weighing. Various modes can be applied such that the weight of the goods filled in the bag made is measured, the measured weight data is fed back to the auger filler to drive a servo motor of the auger screw, the program for a large amount of filling, a small amount of filling or stoppage is installed in the control unit in advance so that while the weight is accurately measured according to the exchange of data with respect to the load cells 19, a given amount of weight is filled in the bag and the operation in association with the auger filler can be carried out.

Figure 7A:
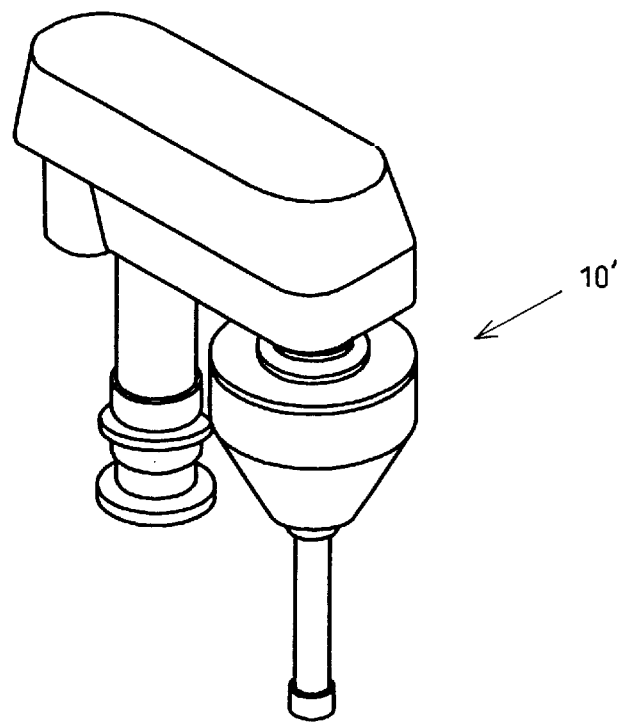
Figure 7B:
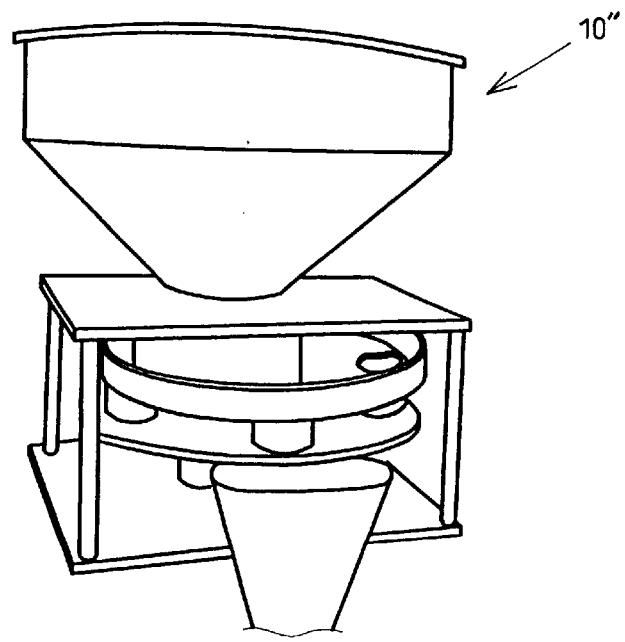

The above mode is applicable to not only the auger filler shown in FIG. 7A but also a volume measuring unit shown in FIG. 7B. Also, there is applicable a system in which a predetermined number of cups for a large amount and cups for a fine amount are prepared, and after filling of the goods is made by the caps for the large amount, the goods are filled by the caps for the fine amount a predetermined number of times, and the filling operation is repeated until the amount reaches a set value.

Also, the applied goods are applicable to foods other than potato chips or other goods As was described above, according to the present invention, basically when the vertical type of bag-making, filling and packaging of the pillow type or the like is carried out, the film sheet drawn out from the bobbin is supplied to the former to make bags. Since the bag is made while weighing the goods to be filled, it is not necessary to provide the weighing unit directly or indirectly disposing on the chute pipe coaxially with the former and the entire size including the vertical length can be compacted, so that an interference of the apparatus with a low ceiling or associated equipments close thereto can be reduced to obtain an easy operation and easy maintenance, inspection or servicing, resulting in such an advantage that the working efficiency is greatly improved.

Also, there is a flexibility in a design to the effect that, not only by weighing the weight directly but also by measuring the capacity in association with an auger, the weight is measured.

Further, a conventional process of the bag-making, filling and packaging, in which the unit bag is made from the film sheet drawn out from the bobbin, and the goods are filled in the bag can be accurately carried out according to the desired design without any changes.

Still further, due to the load cells, since the weights previously known of the former with the support members on the load cells and the cylindrical film sheet having a predetermined length is subtracted from the data of the total weight measured through simple arithmetic operation by the computer disposed in the weighing control unit, only the weight of the goods put in the bag can be accurately measured.

In addition, the draw-down device detachably suck the film sheet through the vacuum unit. With this structure, when weighing is carried out by the load cells, the draw-down unit does not adversely affect the weighing of the goods put and filled in the film sheet through the chute pipe, resulting in such an advantage that the weighing by the load cells can be accurately carried out.

What is claimed is:

1. A vertical type of bag-making, filling and packaging apparatus, comprising:

a frame;

a bobbin mounted on the frame to supply a film sheet;

a former for winding the film sheet supplied around a chute pipe provided vertically and coaxially with the former;

support members for supporting the chute pipe and the former;

at least one load cell fixed on the frame for receiving the weight of the support members;

a vertical heat sealer for sealing the film sheet wound around the chute pipe into a cylinder;

a vacuum draw-down device to draw the cylinder downward by a given stroke corresponding to one bag;

a lateral heat sealer to seal the cylinder laterally at the portion protruded from the lower end of the chute pipe to form a bottom portion of a bag;

a goods weighing unit disposed above the chute pipe for putting a predetermined weight of goods into the cylinder through the chute pipe; and a controller for controlling a sequential timing of the apparatus operations including the vertical sealing, lateral sealing, drawing down of the cylinder and putting a given weight of goods through the chute and into the cylinder after the bottom portion of the bag is formed, the given weight of goods being determined by a calculation based on an electrical signal from the at least one load cell to the controller, wherein a total weight of the support members, the chute pipe, the former, the cylinder and goods supported by the cylinder is measured and floatingly supported by the at least one load cell at a position above said at least one load cell.

2. The apparatus according to claim 1, further comprising an ink injector to indicate the weight of the goods put in the bag on the closed bag.

3. The apparatus according to claim 1, wherein the at least one load cell comprises two load cells.

4. The apparatus according to claim 1, wherein the support members comprise two stays which are provided separately from the frame, the support members being supported by the at least one load cell fixed on the frame, the support members supporting a sub base plate built over the two stays for supporting the chute pipe.

5. A vertical packaging method, comprising:

using a former to wind a film sheet around a vertical chute pipe, the former and the chute pipe being supported by support members, the support members being supported by at least one load cell at a position above said at least one load cell;

joining the sides of the film sheet wound on the chute pipe to form a cylinder of the film sheet the cylinder being supported by the former;

laterally sealing a bottom portion of the cylinder;

placing goods in the cylinder with the laterally sealed bottom;

using the at least one load cell to structurally support the support members at a position above the at least one load cell;

using the at least one load cell to measure a total weight of the cylinder containing the goods for at least one bag, the former, the chute pipe and the support members;

transmitting an electric signal of the total weight from the at least one load cell to a controller, the controller calculating a net weight of the goods in the cylinder and controlling a weighing unit to control the weight of the goods to be put in the bag to a predetermined value drawing the cylinder downward a predetermined distance with a vacuum draw-down device;

sealing the top of the bag filled with goods; and separating the bag having its top sealed from the cylinder.

6. A method of packaging, comprising:

using a former to wind a film sheet from a bobbin around a chute pipe that is coaxial with and vertical to the former, the former and the chute pipe being supported by support members and the support members being supported by at least one load cell at a position above said at least one load cell;

joining the sides of the film sheet wound on the chute pipe with a vertical heat sealer to form a cylinder of the film sheet, the cylinder being supported by the former;

using a lateral heat sealer to laterally seal a bottom portion of the cylinder protruding from the lower end of the chute pipe;

placing goods in the cylinder with the laterally sealed bottom using the chute pipe as a conduit for the goods;

using the at least one load cell to structurally support the support members at a position above the at least one load cell;

using the at least one load cell to measure a total weight of the cylinder containing the goods for at least one bag, the former, the chute pipe and the support members;

transmitting an electric signal of the total weight from the at least one load cell to a controller, the controller calculating a net weight of the goods in the cylinder and controlling a weighing unit to control the weight of the goods to be put in the bag to a predetermined value;

drawing the cylinder downward a distance corresponding to one bag with a vacuum draw-down device;

simultaneously sealing the top of the bag filled with goods and sealing the bottom of a subsequent bag; and separating the bag having its top sealed from the cylinder.

7. The method of packaging of claim 6, further comprising:

using the controller for control of:
drawing down the cylinder with a vacuum device,
laterally sealing the cylinder to form a sealed bottom portion of the cylinder,
calculating the net weight of the goods to be put in the bag,
the weighing unit based on an electrical signal transmitted from the at least one load cell, and
laterally sealing the cylinder to simultaneously form the top of a bag filled with goods and a new sealed bottom portion of the cylinder.

* * * * *